Patented Apr. 6, 1954

2,674,618

UNITED STATES PATENT OFFICE 2,674,618

N-(3-HALO-2-KETOPROPYL)-p-AMINOBENZOATE COMPOUNDS AND METHOD OF PREPARING SAME

David I. Weisblat, Galesburg, and Barney J. Magerlein, Kalamazoo, Mich., and Stanley T. Rolfson, Martinsville, Va., assignors to The Upjohn Company, Kalamazoo, Mich., a corporation of Michigan No Drawing. Application October 30, 1952, Serial No. 317,815

9 Claims. (Cl. 260—470)

This invention relates to certain haloketopropyl compounds, particularly to N-(3-halo-2-ketopropyl)-p-aminobenzoate compounds, and to a method for their preparation. This application is a continuation-in-part of application Serial No. 41,889, filed 1948 July 31, now U. S. Patent No. 2,625,562.

The N-(3-halo-2-ketopropyl)-p-aminobenzoate compounds of the invention have the generic formula

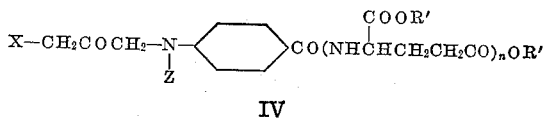

IV

N-(3-halo-2-ketopropyl)-p-aminobenzoate compound wherein R′ is a member of the group consisting of hydrogen and the alkyl radicals, n is a member of the group consisting of zero and the positive integers 1 to 7, inclusive, Z is a member of the group consisting of hydrogen and the arylsulfonyl radicals and X is a member of the group consisting of chlorine, bromine and iodine.

In the naming of compounds of the invention and of other compounds mentioned herein when both a glutamic acid residue and a p-aminobenzoic acid residue are included in the molecule, the nitrogen atom of the glutamic acid residue is, for convenience, herein referred to by the symbol "N′" and the nitrogen atom of the p-aminobenzoic acid residue is referred to by the symbol "N." As indicated by the generic formula given, compounds containing more than one glutamic acid or ester residue contemplated by the invention are those wherein only the gamma-carboxyl groups are involved in the peptide linkages. In the structural formulae given herein, aromatic nuclei are represented by one or more simple hexagons.

The compounds of the invention are of particular value as intermediates in the preparation of certain compounds referred to broadly in the art as "folic acids." Thus, as described and claimed in U. S. Patent 2,558,711, diethyl N′-(N-(3-chloro-2-ketopropyl)-N-(p-toluensulfonyl)-p-aminobenzoyl)-glutamate, which can be prepared by the method of the present invention, can be condensed with 2,4,5-triamino-6-hydroxypyrimidine to form diethyl N′-(N-((2-amino-4-hydroxy-6-pteridyl)-methyl)-N-(p-toluenesulfonyl)-p-aminobenzoyl)-glutamate. The latter compound, upon treatment with hydrogen bromide in an aliphatic acid medium, and in the presence of a bromine acceptor to prevent bromination of the benzene nucleus of the aminobenzoic acid residue, according to the method described and claimed in U. S. Patent 2,562,222, and after subsequent hydrolysis of the ester groups, is converted to N′-(N-((2-amino-4-hydroxy-6-pteridyl)-methyl)-p-aminobenzoyl)-glutamic acid (pteroylglutamic acid) generally recognized, when the glutamic acid residue has the same configuration as 1(+)-glutamic acid, as being identical with the "L. casei factor" or vitamin Bc from liver. When N′-(N-(3-chloro-2-ketopropyl)-p-aminobenzoyl)-glutamic acid is condensed with 2,4,5-triamino-6-hydroxypyrimidine, pteroylglutamic acid is formed directly without the necessity of splitting a sulfonyl radical from the product with hydrogen bromide or of hydrolyzing ester groups. In similar fashion, other N-(3-halo-2-ketopropyl)-p-aminobenzoate compounds of the invention can be condensed with 2,4,5-triamino-6-hydroxypyrimidine to form the corresponding 2-amino-4-hydroxy-6-pteridyl compounds of the folic acid type.

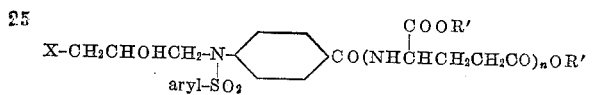

I

N-(3-halo-2-hydroxypropyl)-p-aminobenzoate compound

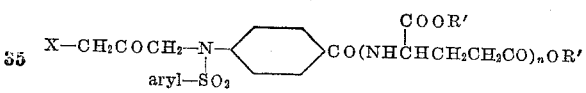

II

N-(3-halo-2-ketopropyl)-p-aminobenzoate compound
(wherein Z of Formula IV=arylsulfonyl)

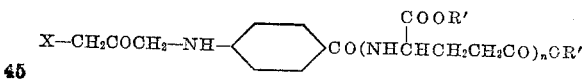

III

N-(3-halo-2-ketopropyl)-p-aminobenzoate compound
(wherein Z of Formula IV=hydrogen)

The N-(3-halo-2-ketopropyl)-p-aminobenzoate compounds of the invention wherein Z of the Formula IV is an arylsulfonyl radical are prepared readily, as shown in the accompanying reaction chart wherein R′, n and X have the values given previously, by oxidizing an N-(3-halo-2- hydroxypropyl)-p-aminobenzoate Compound I with chromic anhydride in an inert water-soluble solvent. The keto Compounds II thus formed can be converted readily to N-(3-halo-2-ketopropyl)-p-aminobenzoate Compounds III of the invention wherein Z of Formula IV is hydrogen by treatment with hydrogen bromide according to the method of U. S. Patent No. 2,562,222 for splitting an arylsulfonyl radical from the molecule. The compounds having the Formulae II and III in the accompanying reaction chart together constitute the compounds of the invention having the Formula IV given previously. Those of the compounds which are esters can be hydrolyzed readily to the corresponding acids with dilute alkali and the acids can be esterified.

The oxidation of an N-(3-halo-2-hydroxypropyl)-N-(arylsulfonyl)-p-aminobenzoate compound with chromic acid can be carried out by subjecting the halohydroxypropyl compound to the action of chromic anhydride in an inert water-soluble solvent. Suitable solvents include the aliphatic acids, such as acetic, propionic, butyric and valeric acids, acetone, and others, as well as mixtures thereof. A mixture of an alkali metal dichromate and a mineral acid, such as sulfuric acid, can often be used in place of chromic anhydride, if desired. A small proportion, e. g. from 5 to 10 per cent or less, of water can often be included in the mixture, if desired. A solution of the N - (3 - halo-2-hydroxypropyl)-N-(arylsulfonyl)-p-aminobenzoate Compound I and of chromic anhydride in acetic acid can be prepared and allowed to stand for several hours at from about 0 degrees to about 30 degrees C. or somewhat higher, or the N-(3-halo-2-hydroxypropyl)-N-(arylsulfonyl)-p-aminobenzoate compound can be added gradually to a solution of chromic anhydride in acetic acid. Reaction usually occurs smoothly at ordinary room temperature, or somewhat below, but the mixture can, in certain instances, be warmed gently, if desired.

The reaction is usually substantially complete in from one to several hours and the N-(3-halo-2-ketopropyl) - N - (arylsulfonyl) - p - aminobenzoate compound can be recovered by diluting the reaction mixture with water and extracting the diluted mixture with ethyl acetate, ether or other suitable solvent. The extract is dried after washing with water or with aqueous sodium bicarbonate, depending upon whether it contains carboxy or carboxylic ester groups, and the ether or other solvent then distilled. The N-(3-halo-2 - ketopropyl) - N - (arylsulfonyl) - p - aminobenzoate compound is thus generally obtained as a solid residue which is usually sufficiently pure for further use but which can, if desired, be purified further by crystallization or in other convenient manner. Purification can also be effected using Girard's reagent P. or T. to yield the halo-keto compounds usually in solid form.

The arylsulfonyl radical can be split readily from an N-(3-halo-2-ketopropyl)-N-(arylsulfonyl)-p-aminobenzoate compound having the Formula II according to the method mentioned previously to form an N-(3-halo-2-ketopropyl)-p-aminobenzoate compound having the Formula III usually without isolating the arylsulfonyl-containing compound from the acetic acid reaction mixture, if desired. The reaction is carried out conveniently by mixing the arylsulfonyl compound, hydrogen bromide and a bromine acceptor, such as phenol, catechol or naphthol, in an anhydrous aliphatic medium, usually at ordinary room temperature. Several molar proportions of hydrogen bromide are usually employed. After standing for a sufficient length of time, usually for from a few minutes to a few hours, the mixture can be poured into ether or petroleum naphtha and the hydrobromide of the free amine recovered by filtering. Other convenient and apparent ways for recovering the amine or its hydrobromide can be employed.

Many of the arylsulfonyl-containing N-(3-halo-2-ketopropyl)-p-aminobenzoate compounds and the free amines obtained as just described are crytalline or amorphous, white or yellowish solids which can be purified by crystallization from a suitable solvent. Others of the compounds are oily in nature. They form crystalline semi-carbazones and other normal ketone derivatives.

As indicated by the generic Formula IV, N-(3-halo-2-ketopropyl)-p-aminobenzoate compounds containing more than one glutamic acid or ester residue contemplated by the invention are those wherein only the gamma-carboxyl groups are involved in the peptide linkages, such as the residues derived from N'-(p-aminobenzoyl)-gamma-glutamylglutamic acid, and the like. Preferred compounds of the invention are those wherein $n$ represents the integer 1, i. e. those containing one glutamic acid or ester residue, and the invention will be described with particular reference thereto.

Compounds similar to, or identical with, those of the folic acid group made by using compounds of the invention as intermediates, such as pteroyl-glutamic acid and pteroyl-gamma-glutamyl-gamma-glutamylglutamic acid, which are of greatest value as measured by their biological activity against *Lactobacillus casei* or *Streptococcus fecalis R*, are those wherein the glutamic acid residues possess the same configuration as l(+)-glutamic acid. However, the invention also contemplates compounds having the dextro configuration as well as racemic mixtures.

N - (3 - halo - 2 - ketopropyl) - p - aminobenzoate compounds wherein Z of the generic Formula IV represents an arylsulfonyl radical, are of particular value because of the protection afforded the aromatic amino group by the arylsulfonyl group. Compounds having the amino group thus protected are often not subject to decomposition and the formation of by-products when employed as a reactant, e. g. when condensed with 2,4,5-triamino-6-hydroxypyrimidine, to nearly the same extent as are compounds in which the aromatic amino group is unprotected. Following the carrying out of a reaction using an N-(3-halo-2-ketopropyl)-p-aminobenzoate compound containing such an arylsulfonylamino group, the arylsulfonyl radical can be split readily from the molecule formed, as mentioned previously, by treating the compound with hydrogen bromide in an aliphatic acid medium and in the presence of a bromine acceptor.

Although the invention is described in the case of arylsulfonyl compounds with particular reference to p-toluenesulfonyl compounds, it is understood that the invention contemplates compounds and intermediates containing other arylsulfonyl radicals, such as the o-toluenesulfonyl, benzenesulfonyl, and naphthalenesulfonyl radicals as well as many others. Arylsulfonyl radicals having substituents, such as chlorine, bromine, or a nitro group, on the aromatic nucleus can also be used provided only that the substituent is non-reactive under the reaction conditions. The preferred arylsulfonyl radical is the p-toluenesulfonyl radical because the compounds formed are generally well defined crystalline solids and because it has been found that higher yields of amines are often formed when splitting a p-toluenesulfonylamino compound than when splitting certain other arylsulfonyl derivatives of the same amino compound. It should be mentioned, furthermore, that the method involved in the present invention can be carried out and the corresponding final compounds prepared using starting compounds wherein the arylsulfonyl group is replaced by an alkylsulfonyl, aralkylsulfonyl or cycloalkylsulfonyl group, such as the methanesulfonyl, alpha-toluenesulfonyl or cyclohexylsulfonyl radicals, respectively.

Although benzoic acid ester or glutamic acid ester residues present in certain of the compounds of the invention can comprise any alkyl ester, such as the methyl, ethyl, n-propyl, iso-propyl, n-butyl, tert.-butyl, amyl, lauryl, dodecyl and many other esters, the preferred ester is the ethyl ester due to matters of convenience and economy.

Although the invention is directed particularly, in case of esters of the aminobenzoic acid and glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

The N - (3-halo-2-hydroxypropyl) -N-(arylsulfonyl) -p-aminobenzoate compounds from which the N - (3-halo-2-ketopropyl) -p-aminobenzoate compounds of the invention can be prepared by oxidation with chromic acid, can, themselves, be prepared in any convenient way. One such way, described in co-pending application Serial No. 41,884, now U. S. Patent 2,629,733, and described and claimed in co-pending application Serial No. 317,813, which is a continuation-in-part thereof, comprises reacting an epihalohydrin, i. e. epichlorohydrin, epibromohydrin or epiiodohydrin, with a p-aminobenzoate compound having the following formula V

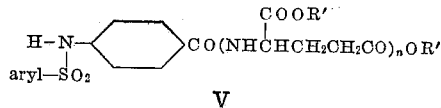

V p-Aminobenzoate compound wherein R' and $n$ have the values given previously. Certain of the latter compounds and their preparation are described and claimed in co-pending application Serial No. 41,888. The N-(3-halo-2-hydroxypropyl) - N - (arylsulfonyl) -p-aminobenzoate compound is formed directly as a result of the reaction and can be isolated in any convenient manner.

Certain advantages of the invention are apparent from the following examples which are given by way of illustration only and are not to be construed as limiting.

*Example 1.—Ethyl N-(3-chloro-2-hydroxypropyl) -N-(p-toluenesulfonyl) -p-aminobenzoate*

A mixture of 5 grams of ethyl N-(p-toluenesulfonyl) -p-aminobenzoate and 3.4 milliliters of epichlorohydrin was heated at 135 degrees C. and 2 drops of pyridine added. A vigorous action ensued and after 5 minutes the mixture was cooled, dissolved in 50 milliliters of ethanol and treated three times with decolorizing carbon. The ethyl N-(3-chloro-2-hydroxypropyl) -N-(p-toluenesulfonyl) -p-aminobenzoate which remained upon volatilization of the ethanol and excess epichlorohydrin in vacuo was used in subsequent reactions without further purification.

In similar fashion methyl N-(3-chloro-2-hydroxypropyl) - N - (o-toluenesulfonyl) -p-aminobenzoate, n-butyl N-(3-chloro-2-hydroxypropyl) - N-(beta-naphthalenesulfonyl) -p-aminobenzoate, and dodecyl N-(3-chloro-2-hydroxypropyl) -N-(p-chlorobenzenesulfonyl) -p-aminobenzoate are obtained by substituting an equimolar proportion of methyl N-(o-toluenesulfonyl) -p-aminobenzoate, n-butyl N-(beta-naphthalenesulfonyl) -p-aminobenzoate, and dodecyl N-(p-chlorobenzenesulfonyl) -p-aminobenzoate, respectively, for the ethyl N-(p-toluenesulfonyl) -p-aminobenzoate in the foregoing procedure.

By using equi-molar proportions of epibromohydrin or of epiiodohydrin in place of epichlorohydrin in the foregoing procedure there are obtained ethyl N-(3-bromo-2-hydroxypropyl) -N-(p-toluenesulfonyl) -p-aminobenzoate and ethyl N-(3-iodo-2-hydroxypropyl) - N - (p-toluenesulfonyl) -p-aminobenzoate, respectively.

*Example 2.—Diethyl N'-(N-(3-chloro-2-hydroxypropyl - N - (p-toluenesulfonyl) -p-aminobenzoate) -glutamate*

A mixture of 2.85 grams of diethyl N'-(N-(p-toluenesulfonyl) - p - aminobenzoyl) - glutamate and 1.1 grams of epichlorohydrin was agitated at 135 degrees C. Two drops of pyridine were added and agitation at 135 degrees C. was continued for 5 minutes. The excess epichlorohydrin was volatilized under reduced pressure. The residue which consisted of diethyl N'-(N-(3-chloro-2-hydroxypropyl) -N-(p-toluenesulfonyl) -p-aminobenzoyl) -glutamate was used in subsequent experiments without further purification.

When an equi-molar proportion of dimethyl N'-(N-(benzenesulfonyl) -p-aminobenzoyl) -glutamate, di-iso-butyl N'-(N-(beta-naphthalenesulfonyl) -p-aminobenzoyl) -glutamate, or di-dodecyl N'-(N-(o-toluenesulfonyl) - p - aminobenzoyl) -glutamate, is substituted for the diethyl N' - (N - (p - toluenesulfonyl) -p-aminobenzoyl) - glutamate in the above procedure, there are obtained dimethyl N'-(N-(3-chloro-2-hydroxypropyl) -N-(benzenesulfonyl) -p-aminobenzoyl) -glutamate, di-iso-butyl N'-(N-(3-chloro-2-hydroxypropyl) -N-(beta-naphthalenesulfonyl) -p-aminobenzoyl) -glutamate and di-dodecyl N'-(N-(3-chloro-2-hydroxypropyl) -N-(o-toluenesulfonyl) -p-aminobenzoyl) -glutamate, respectively.

By using equi-molar proportions of epibromohydrin or of epiiodohydrin in place of epichlorohydrin in the foregoing procedure there is obtained diethyl N'-(N-(3-bromo-2-hydroxypropyl) - N - (p-toluenesulfonyl) -p-aminobenzoyl) - glutamate and diethyl N'-(N-(3-iodo-2-hydroxypropyl) - N - (p - toluenesulfonyl) -p-aminobenzoyl) -glutamate, respectively.

*Example 3.—Ethyl N-(3-chloro - 2 - ketopropyl) - N-(p-toluenesulfonyl) -p-aminobenzoate*

The crude oily ethyl N-(3-chloro-2-hydroxypropyl) -N-(p-toluenesulfonyl) -p-aminobenzoate prepared from 30 grams of ethyl N-(p-toluenesulfonyl) -p-aminobenzoate and an excess of epichlorohydrin was dissolved in 150 milliliters of acetic acid and a mixture of 12 grams of sodium dichromate, 10 milliliters of sulfuric acid, 45 milliliters of water and 60 milliliters of acetic acid was added over a period of three hours while maintaining the mixture at 5 degrees C. After stirring for an additional three hours, the oxidation mixture was diluted with water and extracted with ether. The ethereal extract was washed with sodium bicarbonate and the ether distilled. The residue of ethyl N-(3-chloro-2-ketopropyl) - N - (p-toluenesulfonyl)-p-aminobenzoate crystallized from dilute ethanol on prolonged standing. The crystallized product weighed 5.5 grams and after two crystallizations from dilute ethanol, melted at 106 degrees to 113 degrees C.

*Anal.*—Calcd. for $C_{19}H_{20}O_5NSCl$: C, 55.7; H, 4.9; Cl, 8.7. Found: C, 56.0; H, 4.9; Cl, 6.1.

Following the foregoing procedure and using an equi-molar proportion of methyl N-(3-chloro-2-hydroxypropyl) - N - (o-toluenesulfonyl) - p-aminobenzoate, n-butyl N-(3-chloro-2-hydroxypropyl) - N - (beta - naphthalenesulfonyl) - p-aminobenzoate, dodecyl N-(3-chloro-2-hydroxypropyl) - N - (p - chlorobenzenesulfonyl) - p-aminobenzoate, ethyl N-(3-bromo-2-hydroxypropyl) - N - (p - toluenesulfonyl) - p - aminobenzoate or ethyl N-(3-iodo-2-hydroxypropyl)-N - (p - toluenesulfonyl) - p - aminobenzoate or the corresponding hydroxy acids in place of the ethyl N-(3-chloro-2-hydroxypropyl)-N-(p-toluenesulfonyl)-p-aminobenzoate there is obtained methyl N-(3-chloro-2-ketopropyl)-N-(o-toluenesulfonyl)-p-aminobenzoate, n-butyl N-(3 - chloro - 2 - ketopropyl) - N - (beta - naphthalenesulfonyl)-p-aminobenzoate, dodecyl N-(3 - chloro - 2 - ketopropyl) - N - (p - chlorobenzenesulfonyl)-p-aminobenzoate, ethyl N-(3-bromo - 2 - ketopropyl) - N - (p - toluenesulfonyl)-p-aminobenzoate, ethyl N-(3-iodo-2-ketopropyl) - N - (p - toluenesulfonyl) - p - aminobenzoate, and the corresponding keto acids, respectively The keto esters thus prepared are hydroylzed with dilute alkali to the corresponding keto acids.

*Example 4.—Diethyl N'-(N-(3 - chloro - 2 - ketopropyl) - N - (p - toluenesulfonyl) - p - aminobenzoyl)-glutamate*

The oily diethyl N'-(N-(3-chloro-2-hydroxypropyl) - N - (p - toluenesulfonyl) - p - aminobenzoyl)-glutamate prepared from 2.85 grams of diethyl N'-(p-toluenesulfonyl)-p-aminobenzoyl)-glutamate and an excess of epichlorohydrin was dissolved in 10 milliliters of glacial acetic acid. A mixture of 0.8 gram of chromic anhydride, 18 milliliters of glacial acetic acid and 1 milliliter of water was added slowly with stirring and cooling. The mixture was allowed to stand at room temperature for 12 hours and the acetic acid then volatilized under reduced pressure. The residue was taken up in a mixture of water and ether and the layers separated. The ether layer was washed with water until the washings were no longer green and then treated with charcoal and dried over anhydrous magnesium sulfate. Upon distillation of the ether, there remained diethyl N'-(N-(3-chloro-2-ketopropyl)-N - (p - toluenesulfonyl) - p - aminobenzoyl)-glutamate as a pale yellow viscous oil.

Following the foregoing procedure and using an equi-molar proportion of dimethyl N'-(N-(3 - chloro - 2 - hydroxypropyl) - N - (benzenesulfonyl) - p - aminobenzoyl) - glutamate, di-iso - butyl N' - (N - (3 - chloro - 2 - hydroxypropyl) - N - (beta-naphthalene - sulfonyl) - p-aminobenzoyl)-glutamate, di-dodecyl N'-(N(3-chloro - 2 - hydroxypropyl) - N - (o - toluenesulfonyl)-p-aminobenzoyl)-glutamate, diethyl N' - (N - (3 - bromo - 2 - hydroxypropyl) - N-(p - toluenesulfonyl) - p - aminobenzoyl - glutamate, diethyl N' - (N - (3 - iodo - 2 - hydroxypropyl) - N - (p - toluenesulfonyl - p - aminobenzoyl)-glutamate or of the corresponding hydroxy acids in place of diethyl N'-(N-(3-chloro-2 - hydroxypropyl) - N - (p - toluenesulfonyl)-p-aminobenzoyl)-glutamate, there is obtained dimethyl N' - (N - (3 - chloro - 2 - ketopropyl)-N - (benzenesulfonyl) - p - aminobenzoyl - glutamate, di-iso-butyl N'-(N-(3-chloro-2-ketopropyl) - N - (beta - naphthalenesulfonyl) - p-aminobenzoyl)-glutamate, di-dodecyl N'-(N-(3-chloro - 2 - ketopropyl) - N - (o - toluenesulfonyl)-p-aminobenzoyl)-glutamate, diethyl N'-(N - (3 - bromo - 2 - ketopropyl) - N - (p-toluenesulfonyl) - p - aminobenzoyl) - glutamate, diethyl N' - (N - 3 - iodo - 2 - ketopropyl) - N-(p - toluenesulfonyl) - p - aminobenzoyl) - glutamate, and the corresponding keto acids, respectively.

*Example 5.—Ethyl N-(3-chloro-2-ketopropyl)-p-aminobenzoate hydrobromide*

A mixture was prepared consisting of 0.5 gram of ethyl N-(3-chloro-2-ketopropyl)-N-(p-toluenesulfonyl)-p-aminobenzoate, 0.235 gram of phenol and 5 milliliters of a 25 per cent solution of hydrogen bromide in glacial acetic acid. The mixture was allowed to stand for 2 hours at room temperature and then poured into 40 milliliters of dry ether. The mixture was filtered and the crystalline residue washed with dry ether and then dried. There was obtained 0.07 gram of ethyl N-(3-chloro-2-ketopropyl)-p-aminobenzoate-hydrobromide. This product, when condensed with 2,4,5-triamino-6-hydroxypyrimidine, yielded a product having a marked activity for *Streptococcus fecalis R.*

In entirely analogous fashion and using substantially equi-molar proportions of the respective reactants as used therein, the arylsulfonyl radical is split from methyl N-(3-chloro-2-ketopropyl) - N - (p - toluenesulfonyl) - p - aminobenzoate, n-butyl N-(3-chloro-2-ketopropyl)-N - (beta - naphthalenesulfonyl) - p - aminobenzoate, dodecyl N-(3-chloro-2-ketopropyl)-N - (p - chlorobenzenesulfonyl) - p - aminobenzoate, ethyl N-(3-bromo-2-ketopropyl)-N-(p - toluenesulfonyl) - p - aminobenzoate, ethyl N - (3 - iodo - 2 - ketopropyl) - N - (p - toluenesulfonyl) - p - aminobenzoate, dimethyl - N'-(N - (3 - chloro - 2 - ketopropyl) - N - (benzenesulfonyl) - p - aminobenzoyl) - glutamate, di - iso - butyl N' - (N - (3 - chloro - 2 - ketopropyl) - N - (beta - naphthalenesulfonyl) - p-aminobenzoyl)-glutamate, di-dodecyl N'-(N-(3-chloro - 2 - ketopropyl) - N - (o - toluenesulfonyl)-p-aminobenzoyl)-glutamate, diethyl N'-(N - (3 - chloro - 2 - ketopropyl) - N - (p - toluenesulfonyl) - p - aminobenzoyl) - glutamate, diethyl N' - (N - (3 - bromo - 2 - ketopropyl) - N-(p - toluenesulfonyl) - p - aminobenzoyl) - glutamate, diethyl N'-(N-(3-iodo-2-ketopropyl)-N - (p - toluenesulfonyl - p - aminobenzoyl)-glutamate and the corresponding arylsulfonyl acids to form methyl N-(3-chloro-2-ketopropyl)-p-aminobenzoate, n-butyl N-(3-chloro-2-ketopropyl)-p-aminobenzoate, dodecyl N-(3-chloro-2-ketopropyl)-p-aminobenzoate, ethyl N-(3-bromo-2-ketopropyl)-p-amino-benzoate, ethyl N-(3-iodo-2-ketopropyl)-p-aminobenzoate, dimethyl N' - (N - (3 - chloro - 2 - ketopropyl)-p-aminobenzoyl)-glutamate, di-iso-butyl N'-(N - (3 - chloro - 2 - ketopropyl) - p - aminobenzoyl)-glutamate, di-dodecyl N'-(N-(3-chloro - 2 - ketopropyl) - p - aminobenzoyl) - glutamate, diethyl N' - (N - (3 - chloro - 2 - ketopropyl)- p-aminobenzoyl)-glutamate, diethyl N'-(N-(3-bromo - 2 - ketopropyl) - p - aminobenzoyl)-glutamate, diethyl N'-(N-(3-iodo-2-ketopropyl)-p-aminobenzoyl)-glutamate and the corresponding non-arylsulfonyl acids, respectively.

It is to be understood that the invention is not to be limited to the exact details of operation or exact compounds shown and described, as obvious modifications and equivalents will be apparent to one skilled in the art, and the invention is, therefore, to be limited only by the scope of the appended claims.

We claim:

1. The method which includes: oxidizing a compound having the formula

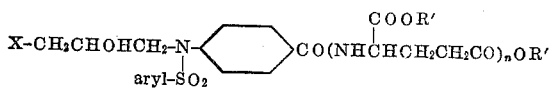

wherein R' is a member of the group consisting of hydrogen and the alkyl radicals, n is a member of the group consisting of zero and the positive integer 1 and X is a member of the group consisting of chlorine, bromine and iodine with chromic acid in an inert water-soluble solvent to form a compound having the formula

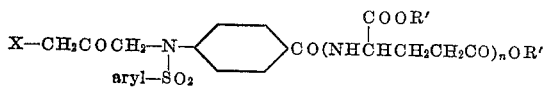

wherein R', n and X have the values given.

2. The method of claim 1 wherein the oxidation is carried out in acetic acid as a reaction medium.

3. The method of claim 1 wherein R' is alkyl, n is the integer 1 and X is chlorine.

4. The method which includes: oxidizing ethyl N-(3-chloro-2-hydroxypropyl)-N-(p-toluenesulfonyl)-p-aminobenzoate with chromic acid in an inert water-soluble solvent to form ethyl N - (3 - chloro - 2 - ketopropyl) - N - (p - toluenesulfonyl)-p-aminobenzoate.

5. The method which includes: oxidizing diethyl N'-(N-(3 - chloro-2-hydroxypropyl)-N-(p-toluenesulfonyl) - p - aminobenzoyl)-glutamate with chromic acid in an inert water-soluble solvent to form diethyl N'-(N-(3-chloro-2-ketopropyl)-N-(p - toluenesulfonyl) - p - aminobenzoyl)-glutamate.

6. A compound having the formula

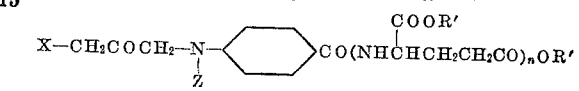

wherein R' is a member of the group consisting of hydrogen and the alkyl radicals, n is a member of the group consisting of zero and the positive integer 1, Z is a member of the group consisting of hydrogen and the arylsulfonyl radicals and X is a member of the group consisting of chlorine, bromine and iodine.

7. A compound having the formula

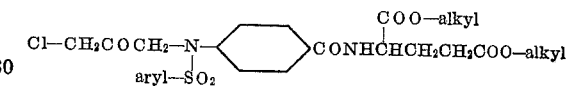

8. Ethyl N-(3 - chloro - 2 - ketopropyl)-N-(p-toluenesulfonyl)-p-aminobenzoate.

9. Diethyl N'-(N-(3-chloro-2-ketopropyl)-N-(p - toluenesulfonyl) - p - aminobenzoyl) - glutamate.

No references cited.